May 1, 1945. A. J. LARRECQ 2,375,006
SUPERCHARGED COMBUSTION ENGINE ARRANGEMENT
Filed July 13, 1942
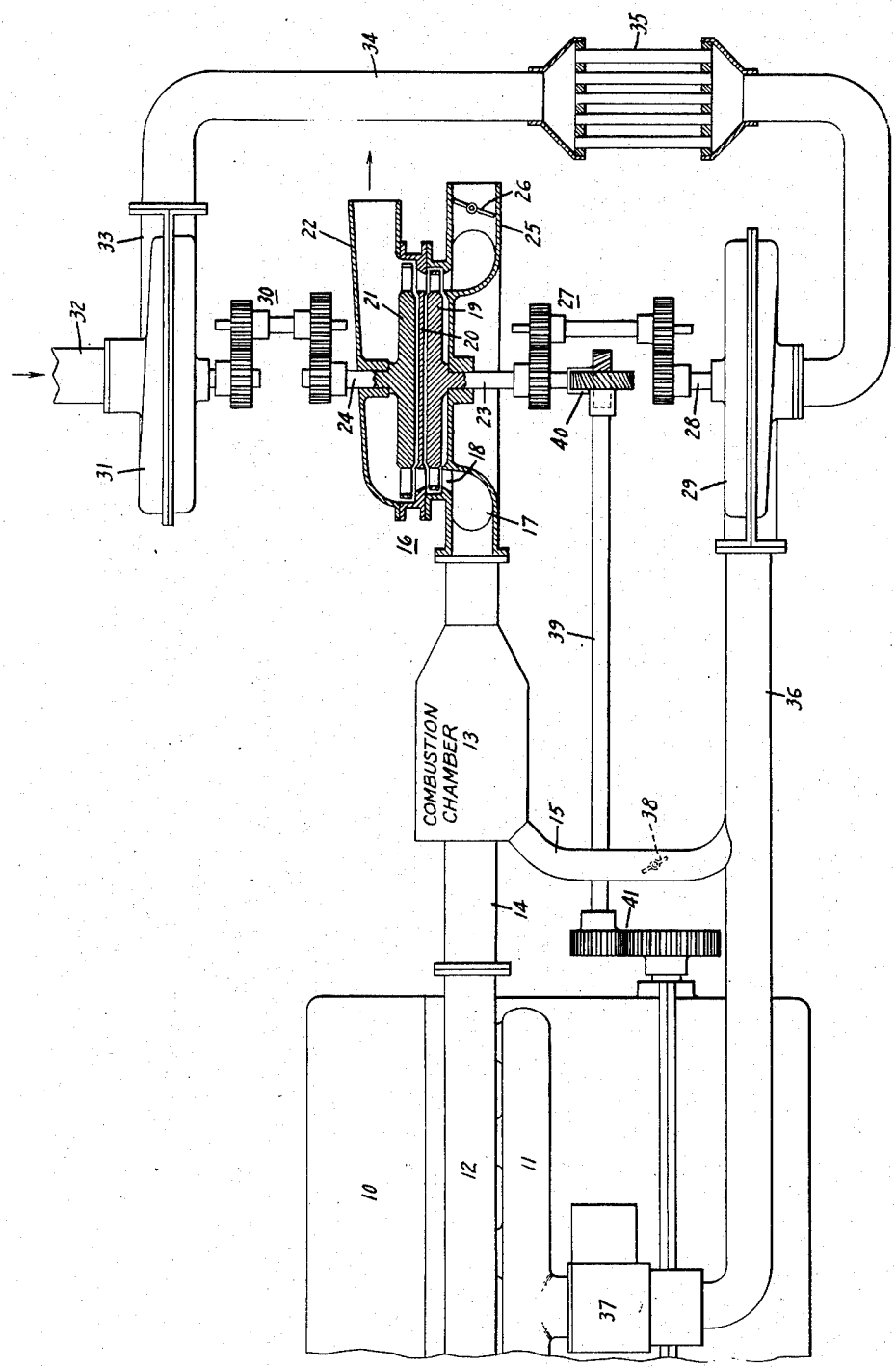
Inventor:
Anthony J. Larrecq,
by Harry E. Dunham
His Attorney.

Patented May 1, 1945

2,375,006

UNITED STATES PATENT OFFICE 2,375,006

SUPERCHARGED COMBUSTION ENGINE ARRANGEMENT

Anthony J. Larrecq, Indianapolis, Ind., assignor to General Electric Company, a corporation of New York Application July 13, 1942, Serial No. 450,820

1 Claim. (Cl. 60—13)

The present invention relates to supercharged combustion engine arrangements of the type including an exhaust gas operated turbine for driving a blower or compressor arrangement to supply air under pressure to a consumer, such as an internal combustion engine.

The object of my invention is to provide an improved construction of such arrangements particularly for use in connection with aircraft whereby greater efficiency and economy are obtained.

For a consideration of what I believe to be novel and my invention, attention is directed to the following description and the claim appended thereto in connection with the accompanying drawing.

The single figure of the drawing illustrates an arrangement embodying my invention.

The arrangement comprises an internal combustion engine 10 which constitutes both a source of exhaust gases and a consumer for air under pressure. The engine has an inlet manifold 11 and an outlet or exhaust manifold 12. The exhaust gases discharged from such engine, especially when used on aircraft, contain a substantial amount of unburned fuel such as carbon. In order to utilize this available energy I provide means for mixing the gases discharged from the engine with air in order to effect complete combustion of the unburned material. The mixing is done in a mixing and combustion chamber 13 which has an inlet 14 connected to receive gases from the manifold 12. Air under pressure is supplied to the chamber 13 through a conduit 15.

The gases are conducted from the chamber 13 to a gas turbine 16. The latter has a nozzle box 17 connected to the chamber 13 and forming a plurality of circumferentially spaced nozzles 18. The turbine has two stages, a first stage which together with the nozzles 18 includes a turbine wheel 19, and a second stage which comprises a diaphragm 20 and a bucket wheel 21. The diaphragm 20 located between the bucket wheels 19, 21 conducts the gases discharged from the wheel 19 to the wheel 21. The gases discharged from the wheel 21 are passed through an exhaust casing 22 into the atmosphere. In order to obtain best efficiency of the turbine the two wheels are supported on separate shafts whereby each may rotate at its optimum speed. The wheel 19 is supported on a shaft 23 and the wheel 21 is secured to a shaft 24. The nozzle box 17 is provided in known manner with a waste gas conduit 25 having a valve 26 therein for controlling the flow of gases therethrough. Each turbine wheel drives a compressor or blower through the intermediary of a step-up gearing. Thus, the shaft 23 of the first stage wheel 19 is connected through a step-up gearing 27 to the drive shaft 28 of a compressor 29 and the shaft 24 of the second stage wheel 21 is connected through a step-up or speed-increasing gearing 30 to another compressor 31. The provision of speed-increasing gearings between the individual turbine bucket wheels and the compressors permits of a more compact construction. An arrangement of this kind is more fully disclosed in my copending application Serial No. 397,378, filed June 10, 1941, and assigned to the same assignee as the present application. The two compressors 29, 31 in the present example are connected in series, thus forming two series-connected stages of a compressor arrangement. The compressor 31 has an inlet 32 for receiving air to be compressed and a discharge conduit 33 connected through a crossover conduit 34 including an intercooler 35 to the inlet of the compressor 29. The intercooler 35 is of the surface type, being cooled by air from the slipstream in case of an aircraft. By reducing the temperature of the compressed medium discharged from the compressor 31 which may be termed the first compressor the amount of work to be performed by the second compressor 29 is substantially reduced or, from another viewpoint, a higher rate of compression may be attained in the second compressor. The second compressor 29 has an outlet connected by a conduit 36 to a carburettor 37 of the engine 10 to supply compressed medium to the inlet manifold 11. The conduit 36 is also connected to the aforementioned conduit 15 whereby part of the compressed air discharged from the compressor arrangement may be conducted through said conduit 15 to the combustion chamber 13. The conduit 15 is provided with a valve 38 for controlling the amount of compressed air flowing therethrough and thus to regulate the relative amounts of air supplied to the engine and to the combustion chamber 13. At times such as during ground level operation in case of an aircraft, not all of the output of the turbine is needed to operate the compressor arrangement. Therefore, means are provided whereby part of this output may be transmitted to the crankshaft of the engine 10. In the present example the shaft 23 of the first turbine stage is connected to supply power to the crankshaft of the engine through a shaft 39 which at one end is connected by a helical gearing 40 to the shaft 23 and at the other end by a gearing 41 to the crankshaft of the engine.

During operation gases discharged from the combustion engine 10 are conducted to the combustion chamber 13 in which they are mixed with air supplied through the conduit 15 to effect complete combustion of unburned fuel contained in the gases. The gases then are conducted to the turbine 16 in which their available energy is utilized for driving two compressors or two stages of a compressor arrangement 29, 31. The compressors in the above arrangement are connected in series to supply air under pressure to the inlet manifold 11 of the engine 10 and to the combustion chamber 13. Part of the mechanical energy available from the turbine is transmitted to the engine crankshaft through the shaft 39.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

Internal combustion engine having an inlet and a discharge manifold, a combustion chamber for receiving exhaust gases from the discharge manifold to burn unburned fuel contained in the gases, a gas turbine having a casing forming an inlet nozzle box with a valved waste conduit and two series-connected mechanically independent bucket wheels in the casing, a conduit connecting the nozzle box to the combustion chamber, a first compressor, a speed increasing gearing for driving the first compressor from one of the bucket wheels, a second compressor, a speed increasing gearing for driving the second compressor from the other bucket wheel, means including an intercooler connecting the compressors in series, conduit means for conducting compressed air from the compressors to the inlet manifold and to the mixing chamber, and means for directly transmitting mechanical power between the engine and one of the compressors.

ANTHONY J. LARRECQ.